United States Patent [19]

Enomoto et al.

[11] Patent Number: 5,100,848

[45] Date of Patent: Mar. 31, 1992

[54] OXIDE TYPE SOLID LUBRICANT CONTAINING CR$_2$O$_3$ AND NA$_2$ZRO$_3$

[75] Inventors: Yuji Enomoto; Kazunori Umeda, both of Tsukuba, Japan

[73] Assignees: Agency of Industrial Science & Technology; Ministry of International Trade & Industry, Tokyo, Japan

[21] Appl. No.: 696,717

[22] Filed: May 7, 1991

[30] Foreign Application Priority Data

May 10, 1990 [JP] Japan ............................ 2-120435

[51] Int. Cl.$^5$ .................. C04B 35/12; C04B 35/48
[52] U.S. Cl. ................................ 501/132; 501/102; 252/12; 428/697; 428/701
[58] Field of Search ............ 501/132, 102; 252/12; 428/697, 701, 702

[56] References Cited

U.S. PATENT DOCUMENTS

| | | | |
|---|---|---|---|
| 3,409,549 | 11/1968 | Freeman | 252/12 |
| 3,711,171 | 1/1971 | Orkin et al. | 501/87 X |
| 3,808,130 | 4/1974 | Schiefer et al. | 252/12 X |
| 4,374,897 | 2/1983 | Yamaguchi | 501/132 X |

*Primary Examiner*—William R. Dixon, Jr.
*Assistant Examiner*—Lisa M. Schull
*Attorney, Agent, or Firm*—Oblon, Spivak, McClelland, Maier & Neustadt

[57] ABSTRACT

An oxide type solid lubricant is made up of a sintered composite ceramic mass of Cr$_2$O$_3$ and Na$_2$ZrO$_3$ and has a Cr$_2$O$_3$ content in the range of from 20 to 50% by weight.

5 Claims, 6 Drawing Sheets

OXIDE TYPE SOLID LUBRICANT CONTAINING $Cr_2O_3$ AND $Na_2ZrO_3$

BACKGROUND OF THE INVENTION

1. Field of the Invention

This invention relates to an oxide type solid lubricant which exhibits stable lubricity over a wide temperature range of from room temperature (about 20° C.) to elevated temperatures of about 1,000° C.

2. Description of the Prior Art

A growing need is being felt in a number of advanced fields of technology for a method of lubricating drive components required to operate smoothly in the open air or in an oxidizing atmosphere at temperatures ranging from room temperature (about 20° C.) to elevated temperatures of about 1,000° C.

The mechanical elements of various high-temperature devices such as, for example, the flow path control devices in supersonic jet engine combustion chambers, the mechanical seals in the combination chambers of ceramic gas turbines, and the drive components in MOCVD devices are frequently exposed to temperature changes within the range of from room temperature to elevated temperatures up to 1,000° C. Oil lubrication is not practical at elevated temperatures and no conventional solid lubricant is able to tolerate the impact of heat ranging from room temperature up to elevated temperatures of around 1,000° C. The mechanical elements must therefore be cooled by a suitable means or be isolated from regions heated to elevated temperatures. These special measures inevitably entail complication of design. If a lubricant can be obtained that is stable within such wide temperature range, the device can be simplified without causing a complex or unreasonable design which forces the relocation of high temperature areas and which compels the separation of mechanical elements from each other, since high temperature resistant materials for device construction are available.

Solid lubricants in common use include $MoS_2$, $WS_2$, graphite, and PTFE. The temperature ranges in which these non-oxide type solid lubricants can be used effectively have upper limits of about 500° C. at most under oxidative environments. At higher temperatures, these solid lubricants deteriorate by oxidation and lose their lubricity.

In contrast, oxide type solid lubricants are naturally stable and can resist oxidation at elevated temperatures.

FIG. 5 shows the lubricity characteristics (coefficients of friction) of typical oxide type solid lubricants as a function of temperature. In the case of non-oxide type solid lubricants, the upper limit of the working temperature is approximately in the range of 350° C. to 500° C. In the case of oxide type solid lubricants, $CoMoO_4$ and $CoO$ exhibit high coefficients of friction at room temperature and have working temperatures approximately in the range of 200° C. to 600° C. and $B_2O_3$ and $NiMoO_4$ melt and exhibit lubricity only at elevated temperatures approximately in the range of 500° C. to 600° C. $PbO$ and $YBa_2Cu_3O_y$ exhibit relatively high lubricity over a wide temperature range from room temperature to elevated temperatures but nevertheless have upper working temperature limits in the neighborhood of 750° C.

An object of this invention is to provide an oxide type solid lubricant which functions stably in the open air or in an oxidizing atmosphere over a wide temperature range from room temperature to elevated temperatures of about 1,000° C.

SUMMARY OF THE INVENTION

To accomplish the aforesaid object of this invention, there is provided an oxide type solid lubricant which is formed of a sintered composite ceramic material resulting from sintering $Cr_2O_3$ and $Na_2ZrO_3$ and having a $Cr_2O_3$ content in the range of about 20 to 50% by weight.

The sintered material constituted as described above constantly exhibits a coefficient of friction near or below 0.6 over a wide temperature range from room temperature (about 20° C.) to elevated temperatures of about 1,000° C. and, therefore, can be used advantageously as a solid lubricant. Thus, it can be effectively used in the mechanical elements of the various high-temperature devices mentioned above.

The other objects and characteristics of this invention will become apparent as the disclosure is made in the following detailed description of a preferred embodiment of the invention based on the accompanying drawings.

DESCRIPTION OF THE PREFERRED EMBODIMENT

Figure 5:
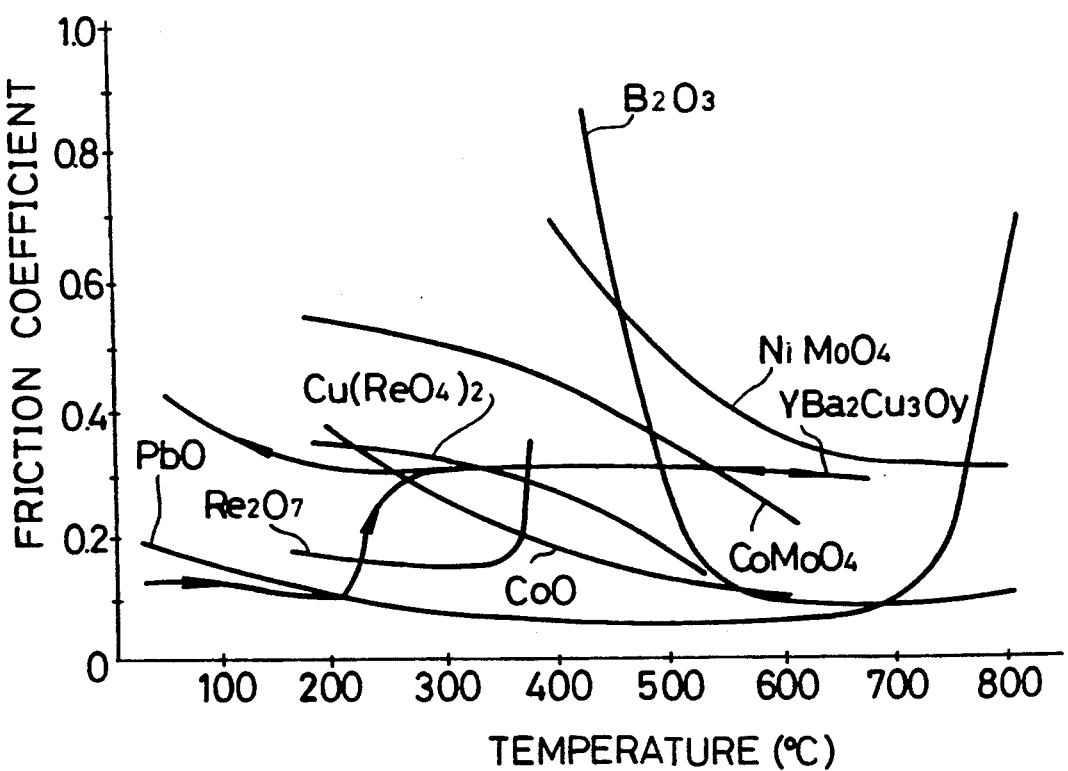
FIG. 5 is a graph showing the changes in coefficient of friction of known oxide type solid lubricants as a function of temperature.

As a solid lubricant to be used stably in the open air or in an oxidizing atmosphere over a range of temperatures extending from room temperature up to elevated temperatures of about 1,000° C., it is preferable to select an oxide type solid lubricant in view of the high stability such lubricants exhibit. As shown in FIG. 5, however, it is difficult to obtain from a simple metal oxide a lubricant satisfying the requirement mentioned above.

The present inventors continued a long study on binary to quaternary oxides in search of an appropriate lubricant. As a result, they have found that a sintered composite ceramic material comprising $Cr_2O_3$ and $Na_2ZrO_3$ is an effective solid lubricant.

Specifically, the inventors first selected from among various dielectric oxide materials, materials of a stratified crystalline structure which were thought likely to excel in lubricity, pulverized these materials, compression molded the resultant powders, and sintered the at temperatures in the range of 900° C. to 1,200° C., to obtain sintered materials. Separately, they simply cold pressed the same powders as prepared above to obtain molded materials. These materials were tested for friction properties. It was consequently found that they all showed coefficients of friction that varied strongly with temperature. Namely, the results were far from satisfactory. Only the sintered materials and the molded material of $Na_2ZrO_3$ exhibited low friction in a specific temperature range.

Since the test mentioned above was a reciprocating friction test, in the next step the same samples were subjected to a one-direction friction test capable of more readily uncovering characteristics of a stratified solid lubricant. In this test, the molded material of $Na_2ZrO_3$ was slid against a counter frictional material made of stainless steel SUS 310S to determine the coefficient of friction. The test was performed by continuously increasing the temperature of a given test piece from 20° C. to 1,000° C. and then continuously decreasing the temperature thence to 20° C. and, in the meantime, measuring the coefficient of friction of the test piece at prescribed temperatures. During the repetition of the cycle of increasing and decreasing the temperature of the test piece, it was observed that the coefficients of friction found in the second cycle were lower than those found in the first cycle and those found in the third cycle were lower than those in the second cycle, and so on. After the friction test, the friction marks remaining on the molded material of $Na_2ZrO_3$ were visually examined and analyzed It was found that the chromium from the counter friction material element of stainless steel had diffused into the molded material of $Na_2ZrO_3$ to discolor the sliding surface of the molded material to yellowish green. This implies that $Cr_2O_3$ and $Na_2ZrO_3$ combined to form the surface of low friction.

The solid lubricant of this invention originated the experiment described below, this solid lubricant is formed of a sintered composite ceramic material produced not merely by mixing the powders of $Cr_2O_3$ and $Na_2ZrO_3$ and, compression molding the resultant mixed powder but also by further sintering the compression molded material at a temperature exceeding 1,000° C. Further, the sintered material has a small coefficient of friction when the $Cr_2O_3$ content thereof is in the range of 20 to 50% by weight.

Figure 1:
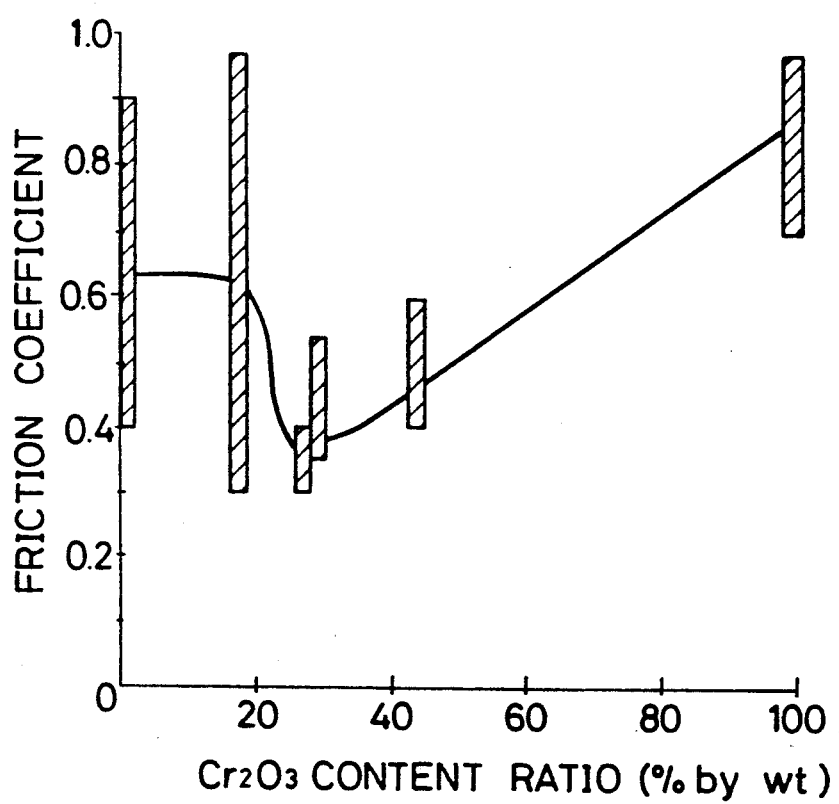
FIG. 1 is a graph showing the relation between the $Cr_2O_3$ content of the sintered material of $Na_2ZrO_3$-$Cr_2O_3$ and the coefficient of friction.

FIG. 1 shows the relation between the $Cr_2O_3$ content and the coefficient of friction of the aforementioned sintered composite ceramic material obtained during the reciprocating friction of the sintered material against an alumina block. In the graph, the hatched regions each indicate the variation in coefficients of friction obtained, in a temperature range of from room temperature to 1,000° C., of sintered materials of compositions represented by the relevant coordinates. The sintered materials having $Cr_2O_3$ contents of not less than 20% by weight exhibit sharply decreased coefficients of friction in a temperature range from room temperature to elevated temperatures of 1,000° C. The sintered materials having $Cr_2O_3$ contents up to about 50% by weight exhibit sufficient lubricity ($\mu \leq 0.5$) for the materials to be useful as a solid lubricant, and particularly the sintered materials having $Cr_2O_3$ contents in the range of from 25% by weight to 30% by weight exhibit low coefficients of friction stably in the range of from 0.2 to 0.5 over a temperature range from room temperature to 1,000° C. and are most suitable as a solid lubricant. For comparison, the coefficients of friction of $Na_2ZrO_3$ alone and $Cr_2O_3$ alone are shown in the same graph.

The production of the sintered material is substantially identical with that ordinarily used for sintering ceramic substances. To be specific, it is accomplished by mixing $Cr_2O_3$ and $Na_2ZrO_3$ in amounts calculated to give the finally produced sintered material, a $Cr_2O_3$ content ratio in the range of 20 to 50% by weight, compression molding the resultant mixture in a prescribed shape, and then firing the molded material at a temperature in the range of from 1,000° C. to 1,300° C.

The sintered material obtained by the procedure just described can be used as it is as a solid lubricant. Otherwise, this sintered material can be pulverized and used in pulverized form as a solid lubricant. In this case, the powdered sintered material may be compression molded in a prescribed shape or it may be converted into a paste by addition of a solvent, applied to a given surface, melted by application of heat, and allowed to form a coating on the surface.

As is plain from the description given thus far, the oxide type solid lubricant of this invention exhibits lubricity stably in the open air or in an oxidizing atmosphere over a wide temperature range from room temperature to elevated temperature of about 1,000° C. It, therefore, can be used directly as a lubricant for such drive components as are in need of smooth motion over a wide range of temperatures. Accordingly, the use of this solid lubricant obviates the necessity for cooling the mechanical elements or isolating them from high-temperature regions and allows high-temperature devices to be designed and constructed with ease.

Now, the present invention will be described specifically below with reference to working examples It should be noted, however, that this invention is not limited to these examples

EXAMPLE 1

The powders of $Cr_2O_3$ and $Na_2ZrO_3$ were mixed at different ratios calculated to give a $Cr_2O_3$ content of 44.1% by weight, 29.1% by weight, or 28.8% by weight to the finally produced sintered material, as shown in Table 1. The mixture was ground in an agate mortar. The powdered mixture was placed in a mold and pressed under a pressure of 1.6 tons/cm$^2$ for five mintues. Thus, there were obtained three compression molded materials having different $Cr_2O_3$ contents and each measuring about 16×10×8 mm. These shaped materials were each heated in an electric oven from 20° C. to 1,000° C. over a period of 1.5 hours, and sintered by being retained at a temperature of 1,100° C. for ten hours. Each sintered shaped material was left to cool spontaneously to room temperature over a period of about 15 hours.

The color of the three shaped materials prior to the sintering treatment was green. After the sintering, the sintered material having a $Cr_2O_3$ content of 44.1% by weight [Test piece No. (1)] was brown, the sintered material having a $Cr_2O_3$ content of 29.1% by weight [Test piece No. (2)] was orange, and the sintered material having a $Cr_2O_3$ content of 28.8% by weight [Test piece No. (3)] was yellowish green.

TABLE 1

| Test piece No. | (1) | (2) | (3) |
|---|---|---|---|
| $Na_2ZrO_3$ (ratio of addition) | 1.9 | 1.85 | 3.7 |
| $Cr_2O_3$ (ratio of addition) | 1.5 | 0.76 | 1.5 |
| $Cr_2O_3$ content ratio (% by weight) | 44.1 | 29.1 | 28.8 |

To be specific, test pieces Nos. (4), (5) and (6) are compression molded materials having $Cr_2O_3$ contents respectively identical with those of test pieces Nos. (1), (2) and (3), but are different from test pieces (1), (2) and (3) in that they were not sintered. Test pieces Nos. (7) is a compression molded material having a $Cr_2O_3$ content of 17% by weight which is obtained by mixing $Na_2ZrO_3$ and $Cr_2O_3$ powders in a ratio of 1.85L0.38 and compression molding the resulting mixture by the use of a cold press. Test piece (8) was obtained by sintering test piece (7) under the same sintering conditions as those of the preceding example.

The three samples according with this invention and the five samples prepared for comparison were each set in place in a reciprocating friction tester, slid reciprocally against an alumina block as a counter, and gradually heated from room temperature. During the elevation of the temperature, the coefficients of friction of the sample were measured at prescribed temperatures.

The results of the measurement were as shown in FIGS. 2 and 3. FIG. 2(a) shows the coefficients of friction of the sintered material of Test piece No. (1), FIG. 2(b) the coefficients of friction of the sintered material of Test piece No. (2), FIG. 2(c) the coefficients of friction of the sintered material of Test piece No. (3), FIG. 2(d) the coefficients of friction of the sintered material of Test piece No. (8), FIG. 3(a) the coefficients of friction of the shaped material of Test piece No. (4), FIG. 3(b) the coefficients of friction of the shaped material of Test piece No. (5), FIG. 3(c) the coefficients of friction of the shaped material of Test piece No. (6), and FIG. 3(d) the coefficients of friction of the shaped material of Test piece No. (7).

Figure 2A:
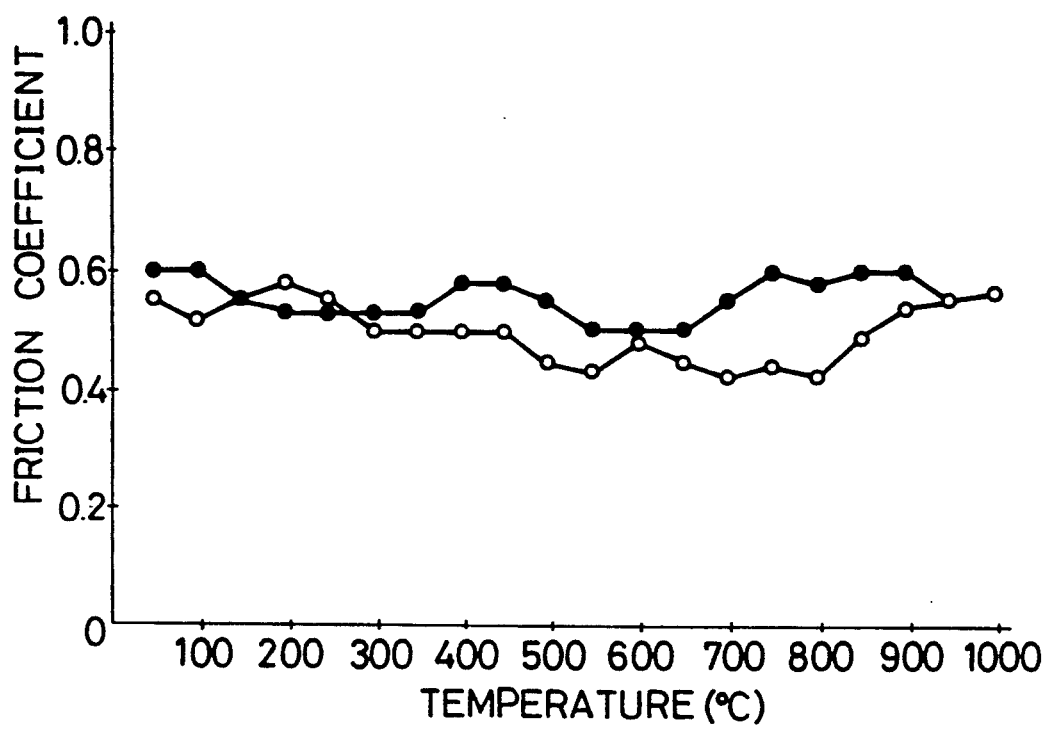
FIG. 2(a) is a graph showing the coefficient of friction of a sintered material having a $Cr_2O_3$ content of 44.1% by weight as a function of temperature.
Figure 3A:
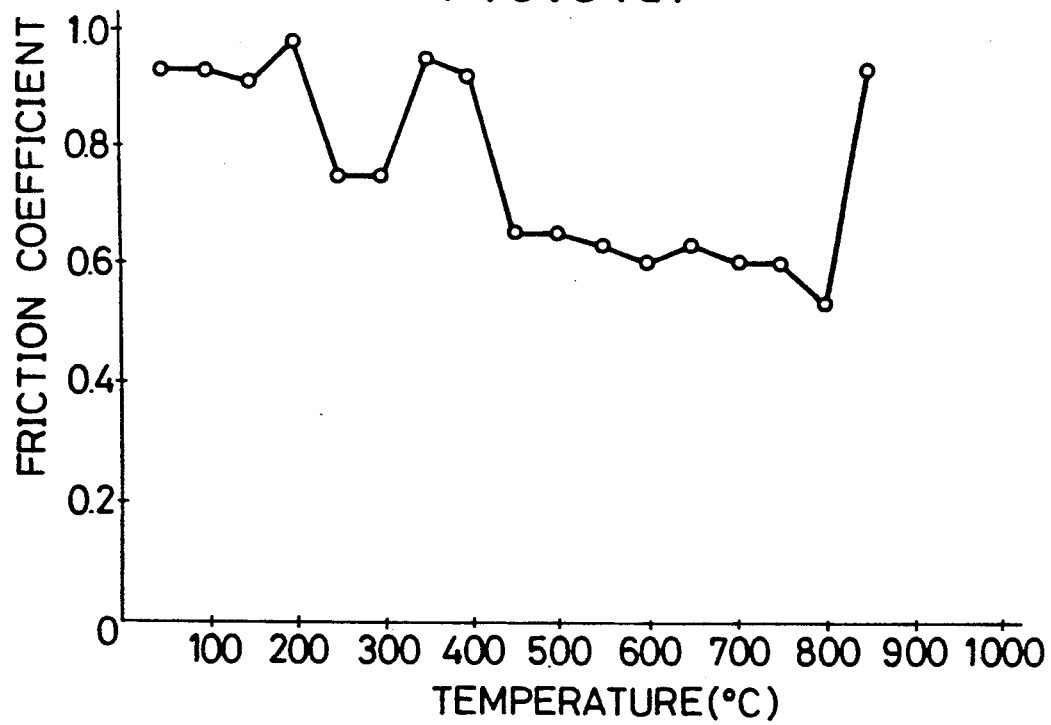
FIG. 3(a) is a graph showing the coefficient of friction of a cold pressed material having a $Cr_2O_3$ content of 44.1% by weight as a function of temperature.
Figure 2B:
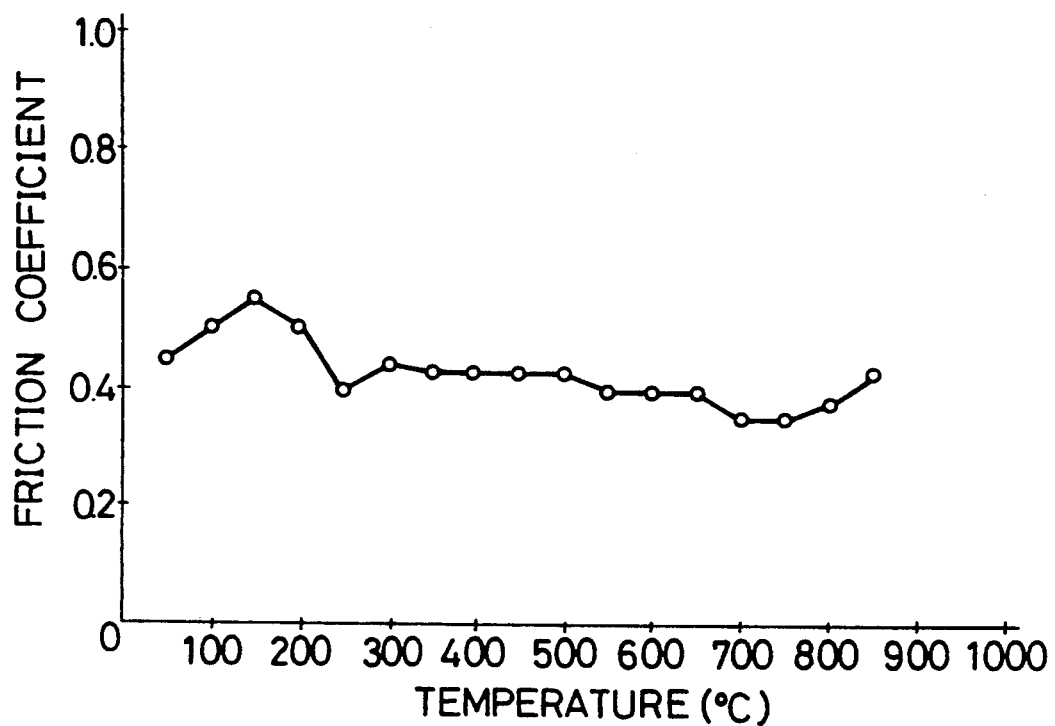
FIG. 2(b) is a graph showing the coefficient of friction of a sintered material having a $Cr_2O_3$ content of 29.1% by weight as a function of temperature.
Figure 3B:
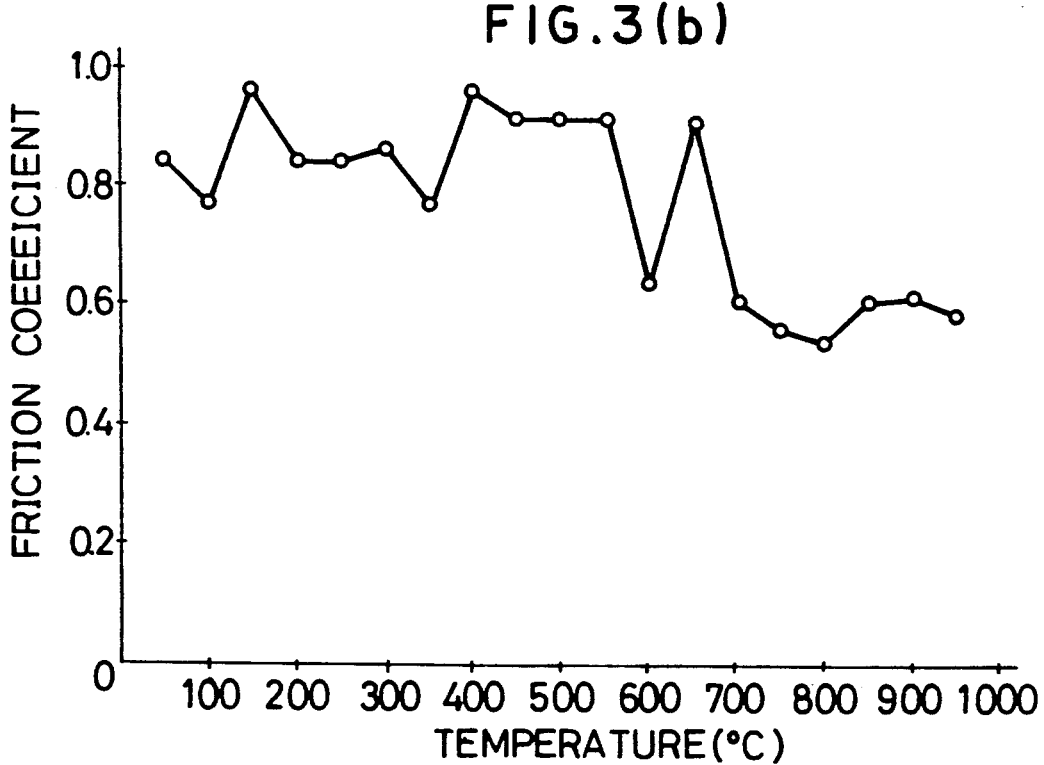
FIG. 3(b) is a graph showing the coefficient of friction of a cold pressed material having a $Cr_2O_3$ content of 29.1% by weight as a function of temperature.
Figure 2C:
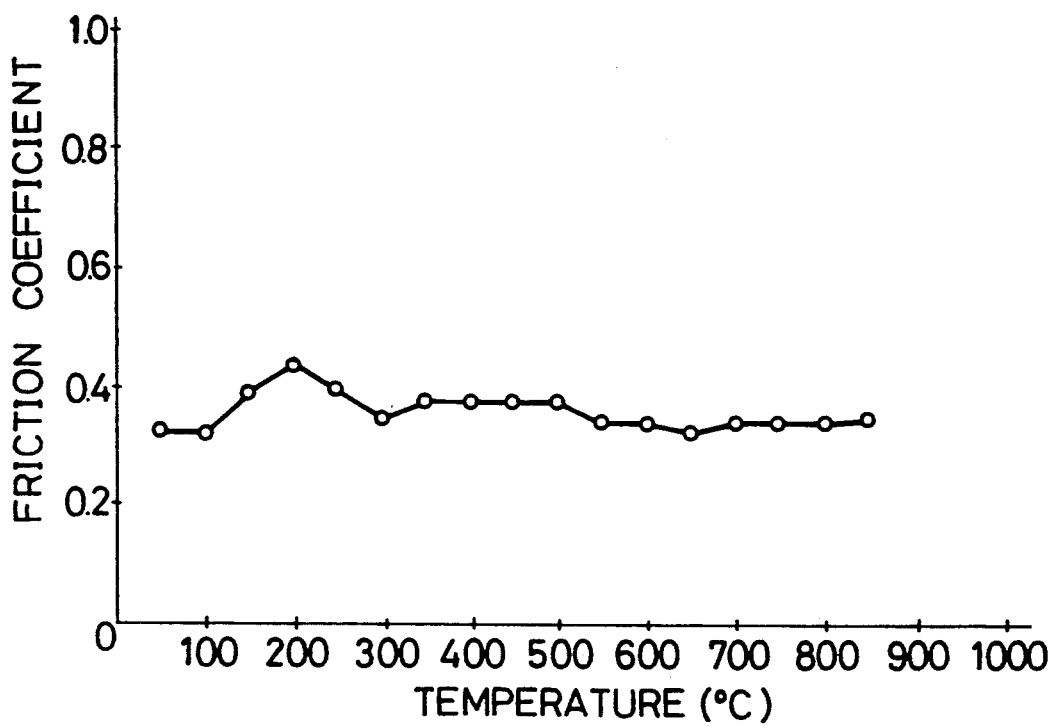
FIG. 2(c) is a graph showing the coefficient of friction of a sintered material having a $Cr_2O_3$ content of 28.8% by weight as a function of temperature.
Figure 3C:
FIG. 3(c) is a graph showing the coefficient of friction of a cold pressed material having a $Cr_2O_3$ content of 28.8% by weight as a function of temperature.
Figure 2D:
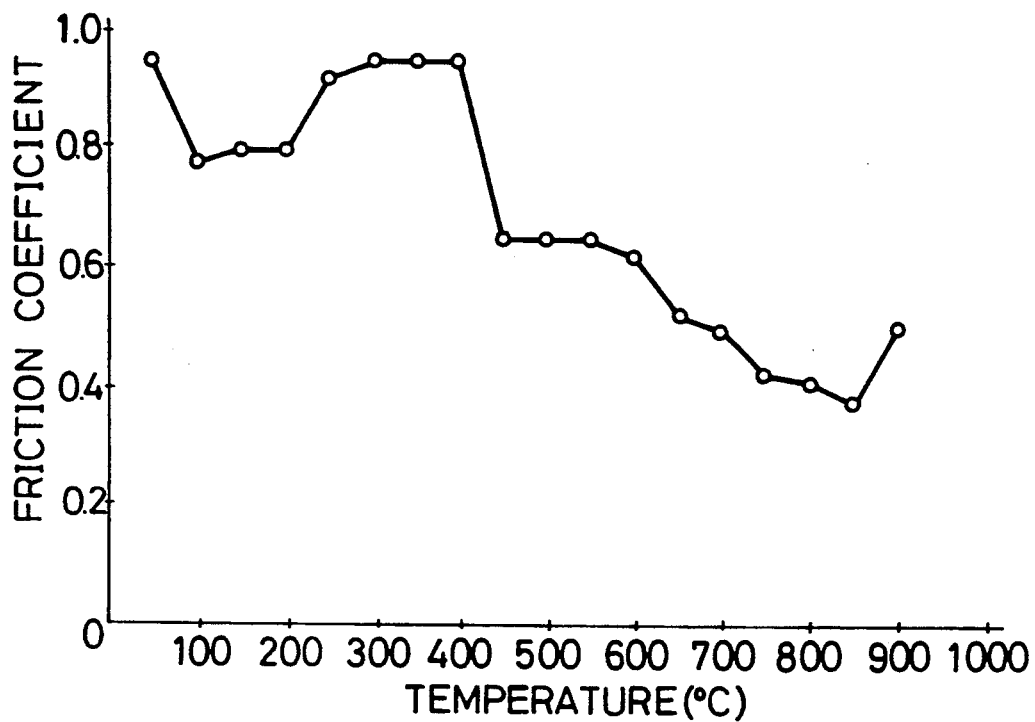
FIG. 2(d) is a graph showing the coefficient of friction of a sintered material having a $Cr_2O_3$ content of 17.0% by weight as a function of temperature.
Figure 3D:
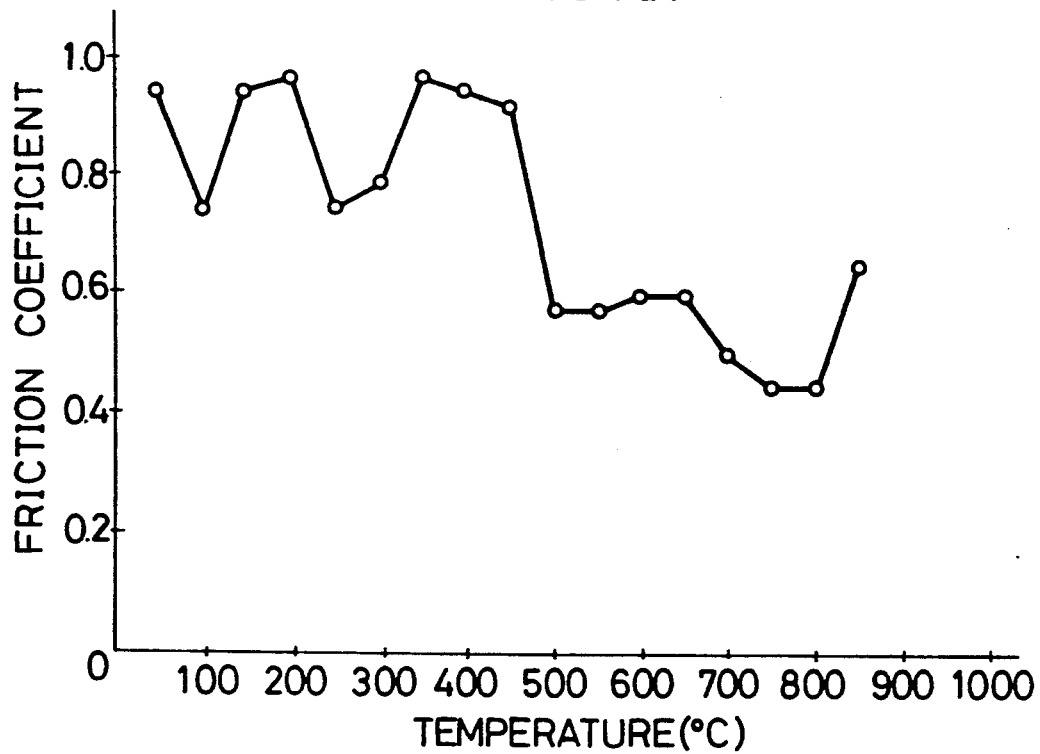
FIG. 3(d) is a graph showing the coefficient of friction of a cold pressed material having a $Cr_2O_3$ content of 17.0% by weight as a function of temperature.

It is clear from the graphs of FIGS. 2(a), (b), and (c) that the coefficients of friction of the sintered materials of Test piece Nos. (1), (2), and (3) showed no noticeable change over the temperature range from room temperature to elevated temperatures of about 1,000° C., indicating that the sintered materials serve satisfactorily as a solid lubricant. In particular the sintered material of Test piece No. (3) retained coefficients of friction near 0.35 and exhibited characteristic properties stably in spite of changes in temperature, indicating that it possessed outstanding properties as a solid lubricant. In FIG. 2(a), the empty circles (○) represent the coefficients of friction obtained during temperature increase and the filled circles (●) those obtained during temperature decrease.

In contrast, the sample of Test piece No. (8), which was a sintered material similar to the samples of Test piece Nos. (1) to (3) and possessed a $Cr_2O_3$ content of 17% by weight, exhibited a high coefficient of friction in a low temperature range and showed outstanding lubricity only in a high temperature range exceeding 500° C.

The compression molded materials, which had not undergone a sintering treatment, all exhibited high coefficients of friction at temperatures about 500° C. or less and trended to exhibit low coefficients of friction at temperatures exceeding 600° C. This behavior of the compression molded materials may occur because their surfaces of friction assumed the same condition as the sintered materials as the temperature increased.

EXAMPLE 2

The sintered material of Example 1 having a $Cr_2O_3$ content of 28.8% by weight was pulverized into a powder having a particle diameter of about 500 μm. The powder was kneaded with alcohol The resultant paste was applied to the surface of an alumina block. The applied layer of the paste was heated and melted at about 1,200° C. by means of high-frequency induction heating to form a coating layer.

An alumina pin having a pointed end 2 mm in radius was pressed against the coating layer under a load of 9.8N and was caused to continue reciprocating friction against the alumina block as the temperature of the coating layer changed from room temperature to an elevated temperature of about 1,000° C. During the reciprocating friction, the coefficients of friction of the coating layer were measured.

Figure 4:
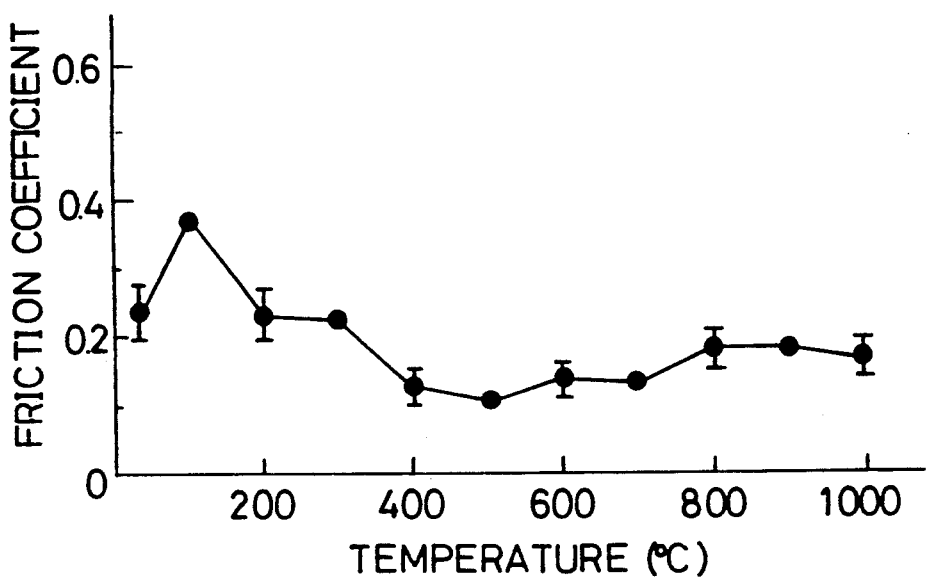
FIG. 4 is a graph showing the coefficient of friction of the coating layer of sintered material having a $Cr_2O_3$ content of 28.8% by weight and superposed on an alumina ceramic substrate as a function of temperature.

The results were as shown in the graph of FIG. 4. It is clear from this graph that the coating layer showed slightly high coefficients of friction at temperatures up to 200° C. and low coefficients of friction not exceeding 0.2 at temperatures exceeding 300° C., indicating that the coating layer of the sintered material possessed outstanding lubricity.

What is claimed is:

1. An oxide type solid lubricant in the form of a sintered composite ceramic material resulting from the sintering of $Cr_2O_3$ and $Na_2ZrO_3$ and having a $Cr_2O_3$ content in the range of from 20 to 50% by weight.

2. A solid lubricant according to claim 1, wherein said sintered composite ceramic material is in the form of powder.

3. A solid lubricant according to claim 1, wherein said sintered composite ceramic material is produced by mixing powders of $Cr_2O_3$ and $Na_2ZrO_3$, molding the resultant mixed powder in a desired shape, and sintering the shaped mass.

4. A solid lubricant according to claim 3, wherein said sintered material is produced by sintering the powders of $Cr_2O_3$ and $Na_2ZrO_3$ at about 1,000° C. to 1,300° C.

5. A lubricated block, comprising:
a substrate block having a lubricating surface thereon of the solid lubricant of claim 4.

* * * * *